United States Patent
Battersby et al.

(10) Patent No.: US 6,840,175 B2
(45) Date of Patent: Jan. 11, 2005

(54) LITHOGRAPHIC PRINTING METHOD USING A SINGLE FLUID INK

(75) Inventors: Graham C. Battersby, Ann Arbor, MI (US); Mark D. Latunski, Morrice, MI (US); Kevin P. Kingman, Brownstown, MI (US); Michael V. Oberski, Ypsilanti, MI (US)

(73) Assignee: Flint Ink Corporation, Ann Arbor, MI (US)

( * ) Notice: Subject to any disclaimer, the term of this patent is extended or adjusted under 35 U.S.C. 154(b) by 0 days.

(21) Appl. No.: 10/300,333

(22) Filed: Nov. 20, 2002

(65) Prior Publication Data

US 2004/0094057 A1 May 20, 2004

(51) Int. Cl.$^7$ ............................................... B41M 1/06
(52) U.S. Cl. ....................................... 101/451; 101/457
(58) Field of Search ........................... 101/450.1, 451, 101/452, 457, 463.1, 465, 46, 466; 430/302

(56) References Cited

U.S. PATENT DOCUMENTS

| | | | |
|---|---|---|---|
| 3,607,255 A | * | 9/1971 | Back ............................ 430/12 |
| 3,661,619 A | | 5/1972 | Surland |
| 3,803,070 A | | 4/1974 | Spencer et al. |
| 3,865,772 A | | 2/1975 | Hulyalkar |
| 4,045,232 A | | 8/1977 | Parkinson |
| 4,255,196 A | | 3/1981 | Emmons et al. |
| 4,327,011 A | | 4/1982 | Ripley et al. |
| 4,348,954 A | * | 9/1982 | Okishi ......................... 101/465 |
| 4,409,077 A | | 10/1983 | Sakiyama et al. |
| 4,469,826 A | | 9/1984 | Carlick et al. |
| 4,475,460 A | * | 10/1984 | Matsumoto ................ 101/465 |
| 4,518,764 A | | 5/1985 | Tanaka et al. |
| 4,686,260 A | | 8/1987 | Lindemann et al. |
| 4,732,616 A | | 3/1988 | Kondo et al. |
| 4,981,517 A | | 1/1991 | DeSanto, Jr. et al. |
| 5,000,787 A | | 3/1991 | Krishnan |
| 5,059,667 A | | 10/1991 | Nakamura |
| 5,163,999 A | | 11/1992 | Uchida et al. |
| 5,165,344 A | | 11/1992 | Matsumoto et al. |
| 5,174,815 A | | 12/1992 | Kondo et al. |
| 5,326,675 A | * | 7/1994 | Niki et al. .................. 430/326 |
| 5,328,936 A | | 7/1994 | Leifholtz et al. |
| 5,338,351 A | | 8/1994 | Pennaz |
| 5,484,866 A | | 1/1996 | Loveless et al. |
| 5,609,993 A | | 3/1997 | Hase et al. |
| 5,616,364 A | | 4/1997 | Clearly et al. |
| 5,629,375 A | | 5/1997 | Jenkins et al. |
| 5,708,112 A | | 1/1998 | Kihara et al. |
| 5,719,246 A | | 2/1998 | Taniguchi et al. |
| 5,736,606 A | | 4/1998 | Yanagi et al. |
| 5,778,789 A | | 7/1998 | Krishnan et al. |
| 5,847,738 A | | 12/1998 | Tutt et al. |
| 5,886,082 A | | 3/1999 | Numa et al. |
| 5,886,125 A | | 3/1999 | Huybrechts |
| 5,973,107 A | | 10/1999 | Margotte et al. |
| 5,986,020 A | | 11/1999 | Campbell et al. |
| 6,095,048 A | | 8/2000 | Ellis ........................... 101/452 |
| 6,140,392 A | | 10/2000 | Kingman et al. |
| 6,207,349 B1 | | 3/2001 | Lewis |
| 6,279,476 B1 | | 8/2001 | Ellis |

(List continued on next page.)

FOREIGN PATENT DOCUMENTS

| | | |
|---|---|---|
| EP | 0662641 A1 | 7/1995 |
| EP | 0732344 A2 | 9/1996 |
| EP | 0814136 A2 | 12/1997 |
| EP | 1213140 A1 | 6/2002 |
| EP | 1243433 A1 | 9/2002 |
| EP | 1270215 A1 | 1/2003 |
| GB | 2113701 | 8/1983 |

*Primary Examiner*—Stephen R. Funk
(74) *Attorney, Agent, or Firm*—Harness, Dickey & Pierce, P.L.C.

(57) ABSTRACT

A planographic printing apparatus and method is provided for single fluid lithographic printing using a plate cylinder having a generally neutral pH hydrophilic material in the non-image areas.

4 Claims, 1 Drawing Sheet

U.S. PATENT DOCUMENTS

| | | |
|---|---|---|
| 6,300,040 B1 | 10/2001 | Lewis |
| 6,482,571 B1 * | 11/2002 | Teng .......................... 430/302 |
| 6,596,464 B2 * | 7/2003 | Van Damme et al. ...... 430/302 |
| 2002/0012881 A1 * | 1/2002 | Inno et al. ................. 430/303 |
| 2002/0072013 A1 * | 6/2002 | Vander Aa .................. 430/302 |
| 2003/0170570 A1 * | 9/2003 | Vander Aa et al. ......... 430/302 |
| 2004/0009363 A1 | 1/2004 | Shouldice et al. .......... 428/523 |

\* cited by examiner

LITHOGRAPHIC PRINTING METHOD USING A SINGLE FLUID INK

FIELD OF THE INVENTION

The present invention relates to a planographic printing apparatus and method for single fluid lithographic printing.

BACKGROUND AND SUMMARY OF THE INVENTION

In lithographic printing, an inked printing plate contacts and transfers an inked image to a rubber blanket, and then the blanket contacts and transfers the image to the surface being printed. Lithographic plates are produced by treating the image areas of the plate with an oleophilic material and insuring that the non-image areas are hydrophilic. In a typical lithographic printing process, the plate cylinder first comes in contact with dampening rollers that transfer an aqueous fountain solution to the hydrophilic non-image areas of the plate. The dampening plate then contacts an inking roller, accepting the ink only in the oleophilic image areas. The press operator must continually monitor the printing process to insure that the correct balance of the fountain solution and the ink is maintained so that the ink adheres to the printing areas of the plate in order to produce a sharp, well defined print.

The industry has long sought an alternative printing process and associated materials and equipment that does not require a dual fountain solution and transfer system. One known alternative is to create waterless plates by applying to the non-image area a silicone rubber having a very low surface energy, which is not wetted by the ink. However, these silicone modified plates are expensive and require specially cooled press equipment since the fountain solution of the traditional two fluid method also serves as a coolant.

To this end, a single fluid ink-water solution has been disclosed in commonly-assigned U.S. Pat. No. 6,140,392, issued Oct. 31, 2000, which is fully incorporated by reference herein.

Additionally, one of the problems with single fluid lithography systems and methods has been the development of a plate cylinder that is capable of separating the emulsified phase from the ink solution of the single fluid ink so that ink adheres to the printing areas of the plate in order to produce a sharp, well defined print.

Accordingly, the present invention provides a printing method utilizing a single fluid ink solution and a plate cylinder having a hydrophilic polymer in the non-image areas that attracts the emulsified fluid of the single fluid ink.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
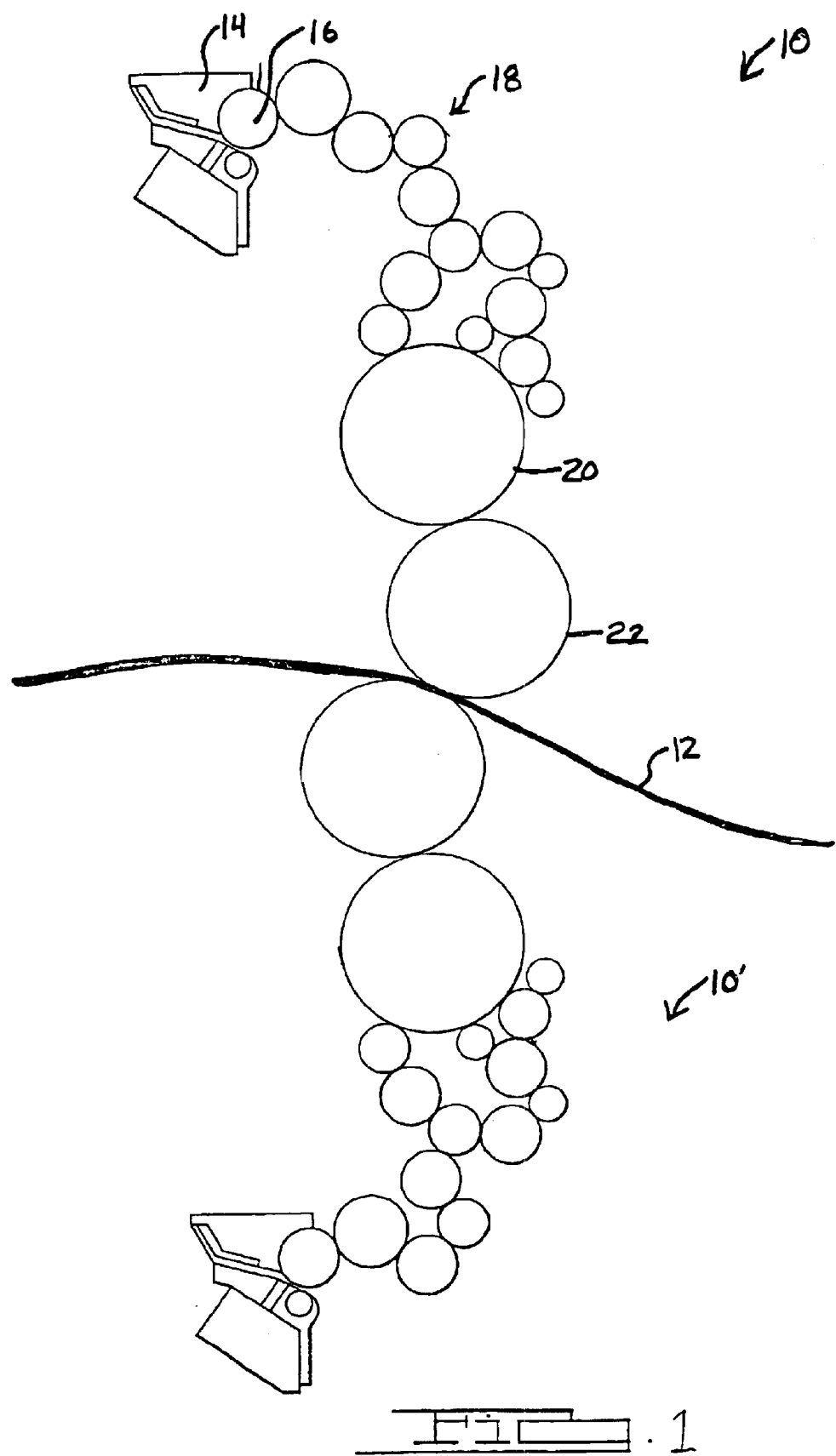
FIG. 1 shows a schematic diagram of a single fluid lithography printing apparatus for use according to the principles of the present invention.

The following description of the preferred embodiment(s) is merely exemplary in nature and is in no way intended to limit the invention, its application, or uses.

Referring now to the drawings, shown in FIG. 1 is a single-fluid planographic printing apparatus 10 for use in delivering a combined ink-water solution to a web material 12. The printing apparatus 10 includes an ink fountain 14 containing a single fluid ink-water solution such as disclosed in U.S. Pat. No. 6,140,392 which is herein incorporated by reference. An ink fountain roller 16 picks up the ink-water solution from the ink fountain 14. A transfer system 18, comprised of a number of individual rollers engaged with one another and including both vibrator and distributor rollers, as are well known in the art, engages the ink fountain roller 16 and communicates the ink-water solution to a plate cylinder 20.

The plate cylinder 20 is produced by treating the image areas of the plate cylinder with an oleophilic material as is well known in the art, and treating the non-image areas of the plate with a hydrophilic material having a generally neutral pH level of between 5 and 8.5. The hydrophilic material can be poly-vinyl alcohol, or other hydrophilic polymers such as poly (ethylene oxides) or block copolymers of PEO/PPO (poly (ethylene-oxide/propylene-oxide) block copolymer), poly (vinyl pyrolidone), or polymers and copolymers of hydroxyethyl acrylate and hydroxyethyl methacrylate (polyester/polyalcohol polymers). The ink-water solution is separated upon the surface of the plate cylinder 20 such that non-image areas receive the emulsified phase, such as water, and the image areas receive ink. The plate cylinder 20 is in rolling engagement with a print member, such as a blanket cylinder 22. The ink-water solution image is then transferred from the plate cylinder 20 to the blanket cylinder 22, preserving the ink-water solution image. The blanket cylinder 22 is engaged with the web material 12 and prints the ink-water solution image upon a surface of the web material 12.

For printing upon one side of the web material 12, the blanket cylinder 22 is in rolling contact, through the web material, with an impression cylinder (not particularly shown) disposed on the opposite side of the web material 12. For printing upon both sides of the web material 12, a substantially identical printing apparatus 10' is disposed on the opposite side of the web and prints to the opposite side of the web material 12 in a substantially identical manner to printing apparatus 10.

With previous systems having separate dampening rollers and an ink roller, the non-image areas of the plate cylinder are generally acidic. The discovery of the present invention is that the use of a generally pH neutral hydrophilic polymer in the non-image areas of the surface of the plate sufficiently attracts the emulsified fluid of the single fluid ink. The emulsified fluid has liquid polyol and/or water, optionally a solid polyol which can hydrogen bond with the polymer on the plate's non-image surface to help keep the ink off. The image areas are oleophilic and therefore the ink adheres to the image areas of the plate cylinder.

In conventional methods, a base metal plate typically would get grained and then anodized to harden the surface. A photo sensitive coating is then applied and the image is cured in the image area (for example, by exposure to UV light), or alternatively, the image could be cured in a non-image area for a positive printing processes. The coating in the non-image area is then washed off (for example, by an alkaline bath) or otherwise removed and the plate cylinder is treated with generally acidic hydrophilic material and separate dampening and ink fountains are utilized. With the present invention, the non-image areas of the plate cylinder are coated with a generally neutral pH hydrophilic polymer material and a single fluid ink is applied to the plate cylinder and the emulsified phase of the single fluid ink adheres to the non-image areas and the ink adheres to the image areas, as required with conventional methods.

Lithographic ink compositions according to the invention are single-fluid inks having a hydrophobic continuous phase that contains a hydrogen bonding vinyl polymer and an emulsified phase that contains water, a liquid polyol, or both water and a liquid polyol. The hydrophobic phase may contain further polymers and/or resins suitable for ink vehicles as well as pigments, while the hydrophilic fluid phase may contain additional materials as well as additives such as weak acids or weak bases to enhance the hydrogen bonding strength of the fluid. The lithographic ink compositions have a sufficient amount of hydrogen bonding between the hydrophobic phase and the hydrophilic phase so that the single fluid ink does not separate in the fountain and a sufficiently limited amount of hydrogen bonding between the hydrophobic phase and the hydrophilic phase so that during application of the ink the emulsion breaks and the water and/or polyol comes to the surface, wetting out the areas of the plate that are not to receive ink. Inks that are stable in the fountain but break quickly to separate on the plate, print cleanly without toning and provide consistent transfer characteristics. Proper stability also may depend upon the particular hydrogen bonding vinyl polymer and the particular polyol chosen. The content of hydrogen bonding groups and molecular weight of the polymer and the amount of the hydrogen bonding vinyl polymer in the ink may be adjusted to provide the desired stability. In general, it is believed that an increase in hydrogen bonding groups on the vinyl resin should be accompanied by a decrease in the amount of such resin included in the hydrophobic phase.

The hydrophilic fluid phase includes water, one or more liquid polyols, or both water and one or more liquid polyols. A liquid polyol is an organic liquid with at least two hydroxyl groups. Polyethylene glycol oligomers such as diethylene glycol, triethylene glycol, and tetraethylene glycol, as well as ethylene glycol, propylene glycol, 1,3-propanediol, dipropylene glycol, 1,4-butanediol, and glycerol are examples of liquid polyols that are preferred for the hydrophilic fluid phase of the single-fluid ink of the invention. The emulsified phase may, of course, include mixtures of different liquid polyols or a mixture water and one or more liquid polyols. In general, higher molecular weight liquid polyols may be preferred when the vinyl polymer of the hydrophobic phase has a higher equivalent weight with respect to the hydrogen bonding groups.

The emulsified phase may include further materials. In one embodiment, the emulsified phase may also include one or more solid polyols. The solid polyols may be selected from solid polyol compounds and solid polyol oligomers. Examples include, without limitation, 2,3-butanediol, 1,6-hexanediol and other hexanediols, pentaerythritol, dipentaerythritol, hydroxyl hyperbranched dendrimers, trimethylolethane, trimethylolpropane, neopentyl glycol, 2,2,4-trimethyl-1,3-pentanediol, 1,4-cyclohexanedimethanol, and hydrogenated bisphenol A. Compounds having one hydroxyl group and up to about 18 carbon atoms, preferably up to about 8 carbon atoms may also be included, such as cyclohexanol and stearyl alcohol. The emulsified phase may also include a weak acid such as citric acid, tartaric acid, or tannic acid, or a weak base such as triethanolamine, which may be included in an amount of from about 0.01 weight percent up to about 2 weight percent of the ink composition. Certain salts such as magnesium nitrate may be included in amounts of from about 0.01 weight percent to about 0.5 weight percent, preferably from about 0.08 to about 1.5 weight percent, based on the weight of the ink composition, to help protect the plate and extend the life of the plate. A water soluble polymer, such as poly(vinyl pyrrolidone), poly(vinyl alcohol), and poly (ethylene glycol), may be added to the emulsified. From about 0.5 weight percent to about 1.5 weight percent of the water soluble polymer is included, based on the weight of the ink composition.

Lithographic, single-fluid inks may be formulated with from about 5% up to about 50%, preferably from about 10% to about 35%, and particularly preferably from about 20% to about 30% of the emulsified fluid phase by weight based on the total weight of the ink composition. Unless another means for cooling is provided, there is preferably a sufficient amount of emulsified fluid in the ink composition to keep the plate at a workably cool temperature, preferably at least about 5% by weight, more preferably at least about 10% by weight, and even more preferably at least about 15% by weight, and up to about 50% by weight, preferably up to about 35% by weight, and more preferably up to about 30% by weight. The amount of the emulsified fluid phase necessary to achieve good printing results without toning may depend upon the kind of plate being used and may be determined by straightforward testing.

The vinyl polymer-containing continuous phase stabilizes the emulsified fluid phase. The stability is such that the two phases do not separate in the fountain. During application of the ink, however, the emulsion breaks and the polyol comes to the surface, wetting out the areas of the plate that are not to receive ink. Inks that are stable in the fountain but break quickly to separate on the plate print cleanly without toning and provide consistent transfer characteristics. Proper stability also may depend upon the particular hydrogen-bonding vinyl polymer and the particular components of the emulsified phase chosen. The hydrogen bonding equivalent weight and molecular weight of the vinyl polymer, as well as the concentration of the vinyl polymer in the continuous phase, may be adjusted to provide the desired stability. Vinyl polymers with higher levels of hydrogen bonding groups (lower equivalent weights) can generally be used in lower amounts, but in general the concentration of hydrogen bonding groups may not be excessively high or else the vinyl polymer will not be sufficiently soluble in the continuous phase. Destabilizing interactions, such as between an additional polymer, resin, or other material of the continuous phase and the emulsified fluid phase, is avoided. In general, additional materials that are more hydrophilic than the hydrogen-bonding vinyl polymer are avoided.

The hydrophobic phase of the single-fluid ink includes at least a vinyl polymer having groups that can hydrogen bond with one or more components of the hydrophilic fluid phase. The hydrogen bonding vinyl polymers of the invention are prepared by polymerization of a monomer mixture that includes one or more monomers that contain hydrogen bonding groups or by adducting the polymer with hydrogen bonding groups or converting other groups to the desired hydrogen bonding groups after polymerization. The vinyl polymers of the invention are advantageously branched by including in the polymerization reaction monomers that have two reaction sites or by reacting the polymer with a material having a plurality of groups reactive with the polymer. When the vinyl polymer is branched, it nonetheless remains usefully soluble. By "soluble" it is meant that the polymer can be diluted with one or more solvents. (By contrast, polymers may be crosslinked into gels, which are insoluble, three-dimensional network structures that are only be swelled by solvents.) The branched vinyl resins of the invention unexpectedly retain solvent dilutability in spite of significant branching.

The hydrogen bonding vinyl polymers of the invention may be prepared by polymerizing a monomer mixture that includes at least one monomer that contains a hydrogen bonding group or a group that can be converted to or adducted with a hydrogen bonding group after polymerization. Among preferred hydrogen bonding groups are carboxylic acid groups, carboxylic anhydride groups, primary amines or amines having alkyl substituents of three or fewer carbon atoms on the nitrogen atom, primary amides or amides having alkyl substituents of three or fewer carbons on the nitrogen atom, esters having pendant alkyl groups of three or fewer carbon atoms, β-hydroxyl esters, hydroxyls, or sulfur-containing groups.

Carboxyl-functional vinyl polymers of the invention may be prepared by polymerization of a monomer mixture that includes at least one acid-functional monomer or at least one monomer that has a group that is converted to an acid group following polymerization, such as an anhydride group. Examples of acid-functional or anhydride-functional monomers include, without limitation, α,β-ethylenically unsaturated monocarboxylic acids containing 3 to 5 carbon atoms such as acrylic, methacrylic, and crotonic acids; α,β-ethylenically unsaturated dicarboxylic acids containing 4 to 6 carbon atoms and the anhydrides and monoesters those acids, such as maleic anhydride, maleic acid monomethyl ester, and fumaric acid; and acid-functional derivatives of copolymerizable monomers, such as the hydroxyethyl acrylate half-ester of succinic acid. Acid functionality may also be provided by other known means, such as by reaction of an hydroxyl group with an anhydride or by hydrolysis of an ester, such as by hydrolysis of a tert-butyl methacrylate monomer unit. It is preferred to include an acid-functional monomer such as acrylic acid, methacrylic acid, or crotonic acid, or an anhydride monomer such as maleic anhydride or itaconic anhydride that may be hydrated after polymerization to generate acid groups. It is preferred for the acid-functional vinyl polymer to have an acid number of at least about 3 mg KOH per gram nonvolatile, preferably an acid number of from about 6 to about 30 mg KOH per gram nonvolatile, and more preferably an acid number of from about 8 to about 25 mg KOH per gram nonvolatile, based upon the nonvolatile weight of the vinyl polymer.

Examples of amines and amide groups include, without limitation, primary amides, N-alkylamides in which the N-alkyl group has three or fewer carbon atoms, N,N'-dialkylamides in which each N-alkyl group has three or fewer carbon atoms, primary amines, N-alkylamines in which the N-alkyl group has three or fewer carbon atoms, N,N'-dialkylamines in which the N-alkyl group has three or fewer carbon atoms, phosphonamides, and sulfonamides. Examples of suitable amine and amide functional, ethylenically unsaturated monomers include, without limitation, acrylamide, methacrylamide, p-dimethylaminostyrene, N-, dimethylaminoethyl methacrylate, aminopropyl methacrylate, aminoethyl acrylate, aminopropyl acrylate, aminoethyl methacrylate, 1-vinyl-2-pyrrolidinone, N-alkylacrylamides, N-alkylmethacrylamides, N,N'-dialkylacrylamides, and N,N' dialkylmethacrylamides, in which the alkyl group have 3 or fewer carbon atoms. Specific examples include N-methylacrylamide, N-methylmethacrylamide, N-isopropyl acrylamide, N-isopropyl methacrylamide, N,N-dimethylacrylamide, N,N'-dimethylmethacrylamide, N,N'-diisopropylmethacrylamide, N-vinyl formamide, and combinations of these.

Examples of sulfur-containing groups include sulfonic acids, sulfonamides, sulfoxides, sulfones, and mercaptans. Mercaptans may be included as chain transfer agents. Examples of suitable monomers include, without limitation, 2-acrylamido-2-methylpropane sulfonic acid, methyl vinyl sulfone, methyl vinyl sulfoxide, and sodium vinyl sulfonate. A copolymer of sodium vinyl sulfonate may be acidified, then treated with dialkylamine to give the sulfonamide.

Examples of monomers providing phosphorous-containing groups include, without limitation, vinyl phosphoric acid, which may be esterified to give the phosphate or amidified with dialkylamine to give the phosphonamide.

Examples of suitable ethylenically unsaturated hydroxyl monomers include, without limitation, hydroxyethyl acrylate, hydroxypropyl acrylate, hydroxybutyl acrylate, hydroxyethyl methacrylate, hydroxypropyl methacrylate, and hydroxybutyl methacrylate. Hydroxyl-functional groups may also be obtained on the vinyl polymer, for example, by hydrolysis of ester groups, e.g. hydrolysis of vinyl acetate monomer units to vinyl alcohol, or by reaction of an acid group with an oxirane group, e.g. reaction of a glycidyl methacrylate monomer unit with acetic acid or reaction of a methacrylic acid monomer unit with ethylene oxide. It is preferred to add weakly basic materials to the hydrophilic fluid phase in order to strengthen the hydrogen bonding between the hydroxyl-functional vinyl polymer and the components of the hydrophilic fluid phase.

Suitable esters include methyl, ethyl, n-propyl, and iso-propyl esters of polymerizable acids, for example methyl methacrylate, ethyl acrylate, monomethyl maleate, diethyl maleate, and so on, as well as ethylenically unsaturated esters of saturated acids having up to four carbon atoms such as the formate, acetate, propionates, and butyrates of hydroxyethyl acrylate or hydroxyethyl methacrylate or vinyl formate, vinyl acetate, vinyl propionates, and vinyl butyrates.

Acetoacetate groups are also useful for hydrogen bonding and monomers containing the acetoacetate group may be obtained by reacting an allyl halide with 2,4-pentanedione that has been treated with a strong base (e.g., KOH) to produce the stabilized carbanion. The resulting acetoacetate-functional monomer is copolymerized to provide an acetoacetate-functional vinyl polymer. Another acetoacetate-functional monomer is acetoacetoxyethyl methacrylate.

The hydrogen bonding vinyl polymer of the invention may also contain a combination of the above functional groups capable of forming hydrogen bonding interactions. The vinyl polymers preferably has an equivalent weight, based on the hydrogen bonding groups, of preferably at least about 1800 g/equivalent, more preferably at least about 2200 g/equivalent, and preferably up to about 20,000 g/equivalent, more preferably up to about 7200 g/equivalent.

The hydrogen bonding group of the vinyl polymer may be a hydrogen donating species and/or a hydrogen accepting species. It will be appreciated that the vinyl polymer and the hydrophilic fluid may have the same chemical functional group participating as both the donor species and the acceptor species of the hydrogen bond pair. For example, hydroxyl groups on the vinyl polymer may interact with hydroxyl groups of the hydrophilic phase. By the same token, the donor and acceptor species may be different chemical groups. For example, an amide group may hydrogen bond with an hydroxyl group. In addition, some functional groups on the hydrogen bonding vinyl polymers may serve as acceptor species, others as donor species, and others as both. In general, the water and/or polyol(s) of the hydrophilic fluid phase can act both as acceptors and donors.

The strength of a hydrogen bond is related to the relative acidity and basicity of the donor and acceptor species. If it is desired to strengthen the hydrogen bond formed between a donor with a weakly acidic hydrogen atom and an acceptor, it is possible to add acidic materials to the donor species to increase its hydrogen bonding affinity. Alternatively, a weakly basic material may be added to a hydrogen acceptor to increase the strength of a hydrogen bond. In some situations, ionic interaction may be moderated and controlled by appropriate additions of weak acids and weak basis to the donor and acceptors.

The hydrogen bonding vinyl polymers are branched. In one embodiment, the hydrogen bonding vinyl polymers are significantly branched. The vinyl polymer that is branched but usefully soluble. The branched vinyl polymers of the invention is diluted, rather than swollen or dispersed, by addition of solvent. The branching may be accomplished by a number of methods. In a first method, a monomer with two or more polymerizable double bonds is included in the polymerization reaction. In a second method, a pair of ethylenically unsaturated monomers, each of which has in addition to the polymerizable double bond at least one additional functionality reactive with the additional functionality on the other monomer, are included in the monomer mixture being polymerized. A third method consists of crosslinking the polymer with a crosslinker having at least two functional groups that react with functional groups on the polymer.

Preferably, the vinyl resin of the invention is polymerized using at least one monomer having two or more polymerizable ethylenically unsaturated bonds. Illustrative examples of monomers having two or more ethylenically unsaturated moieties include, without limitation, (meth)acrylate esters of polyols such as 1,4-butanediol di(meth)acrylate, 1,6-hexanediol di(meth)acrylate, neopentyl glycol di(meth)acrylate, trimethylolpropane tri(meth)acrylate, tetramethylolmethane tetra(meth)acrylate, pentaerythritol tetra(meth)acrylate, dipentaerythritol penta(meth)acrylate, dipentaerythritol hexa(meth)acrylate, alkylene glycol di(meth)acrylates and polyalkylene glycol di(meth)acrylates, such as ethylene glycol di(meth)acrylate, butylene glycol di(meth)acrylate, diethylene glycol di(meth)acrylate, triethylene glycol di(meth)acrylate, and polyethylene glycol di(meth)acrylate; divinylbenzene, allyl methacrylate, diallyl phthalate, diallyl terephthalate, and the like, singly or in combinations of two or more. Of these, divinylbenzene, butylene glycol dimethacrylate, butanediol dimethacrylate, trimethylolpropane triacrylate, and pentaerythritol tetraacrylate are highly preferred, and divinylbenzene is still more highly preferred.

Preferably, the branched vinyl polymer is polymerized using at least about 0.008 equivalents per 100 grams of monomer polymerized of at least one monomer having at least two ethylenically unsaturated polymerizable bonds, or 0.004 equivalents per 100 grams of monomer polymerized of each of two monomers having mutually reactive groups in addition to an ethylenically unsaturated polymerizable bond. Preferably, the branched vinyl polymer is polymerized using from about 0.012 to about 0.08 equivalents, and more preferably from about 0.016 to about 0.064 equivalents per 100 grams of monomer polymerized of the polyfunctional monomer or monomers having at least two ethylenically unsaturated polymerizable bonds or of the pair of monomers having one polymerization bond and one additional mutually reactive group. The polyfunctional monomer or monomers preferably have from two to four ethylenically unsaturated polymerizable bonds, and more preferably two ethylenically unsaturated polymerizable bonds. In one embodiment it is preferred for the branched vinyl resin to be prepared by polymerizing a mixture of monomers that includes from about 0.5% to about 6%, more preferably from about 1.2% to about 6%, yet more preferably from about 1.2% to about 4%, and even more preferably from about 1.5% to about 3.25% divinylbenzene based on the total weight of the monomers polymerized. Commercial grades of divinylbenzene include mono-functional and/or non-functional material. The amount of the commercial material needed to provide the indicated percentages must be calculated. For example, 5% by weight of a material that is 80% by weight divinylbenzene/20% mono-functional monomers would provide 4% by weight of the divinylbenzene fraction.

The optimum amount of divinylbenzene or other monomer having at least two polymerizable ethylenically unsaturated bond that is included in the polymerization mixture depends to some extent upon the particular reaction conditions, such as the rate of addition of monomers during polymerization, the solvency of the polymer being formed in the reaction medium chosen, the amount of monomers relative to the reaction medium, the half-life of the initiator chosen at the reaction temperature and the amount of initiator by weight of the monomers, and may be determined by straightforward testing.

Alternatively, the polymers can be crosslinked by including in the monomer mixture at least a pair of monomers having at least one functionality reactive with the functionality of the other monomer. Preferably, the reaction of the additional functional groups takes place during the polymerization reaction, although this is not seen as critical in the formation of a polymer according to the invention and the reaction of the additional functional groups may be carried out partially or wholly before or after polymerization. A variety of such pairs of mutually reactive groups is possible. Illustrative examples of such pairs of reactive groups include, without limitation, epoxide and carboxyl groups, amine and carboxyl groups, epoxide and amine groups, epoxide and anhydride groups, amine and anhydride groups, hydroxyl and carboxyl or anhydride groups, amine and acid chloride groups, alkylene imine and carboxyl groups, organoalkoxysilane and carboxyl groups, isocyanate and hydroxyl groups, cyclic carbonate and amine groups, isocyanate and amine groups, and so on. When the hydrogen bonding groups are included as one of the reactive groups, they are used in a sufficient excess to provide the desired hydrogen bonding functionality in the vinyl resin. Specific examples of such monomers include, without limitation, glycidyl (meth)acrylate with (meth)acrylic acid, N-alkoxymethylated acrylamides (which react with themselves) such as N-isobutoxymethylated acrylamide, gamma methacryloxytrialkoxysilane (which reacts with itself), and combinations thereof. In connection with the description of this invention, the term "(meth)acrylate" will be used to refer to both the acrylate and the methacrylate esters, the term "(meth)acrylic" will be used to refer to both the acrylic and the methacrylic compounds, and so on.

The polymers of the invention may also be branched by subjecting the polymer to reaction with a limited amount of a crosslinking compound after polymerization. The amount of crosslinking is limited so that the vinyl polymer remains soluble in the continuous phase. Such crosslinkers include at least two functional groups reactive with functional groups on the polymer. The reactive groups on the crosslinker may be the same or different, and the crosslinker will be selected according to what functional groups are present on the polymer. It should be noted that many of the hydrogen bonding functional groups on the hydrogen bonding vinyl polymer are capable of being crosslinked. Generally, such crosslinking occurs at a low stoichiometric ratio so that after such crosslinking there are still available hydrogen bonding groups to form hydrogen bonds with components of hydrophilic fluid phase as described above. Examples of crosslinkers include, without limitation, polycarboxylic acids, polyamines, polyisocyanates, and polyhydroxyl containing species. Non-limiting examples of crosslinkers include diethylene glycol, triethylene glycol, hexanediamine, adipic acid, neopentyl glycol, dipropylene glycol, tripropylene glycol, 1,4-cyclohexanedimethanol, 1,6-hexanediol, 1,3-butanediol, hydrogenated bisphenol A, 2,2,4-trimethyl-1,3-pentanediol, and the like.

Aluminum gellants may also be used as the external crosslinker. Such aluminum gellants may be aluminum salts, aluminum organic complexes, or aluminum alkoxides. The aluminum gellants crosslink the hydrogen bonding vinyl polymer by forming aluminum alkoxide bridges between reactive groups on the polymer. Specific examples of aluminum gellants useful in the invention include, without limitation, aluminum acetoacetonate, aluminum triisopropoxide, aluminum tris-sec-butoxide, aluminum diisopropoxide aceto ester, aluminum oxyacylate (OAO from Chattem Chemicals), and combinations of these. In addition, alkoxylated titanates and zirconates may be used, for example, without limitation, di(cumyl)phenyl oxoethylene titanate, di(dioctyl) phosphato ethylene titanate, diisopropyl distearoyl titanate, the corresponding zirconates, and combinations of these. Combinations of aluminum gellants, alkoxylated titanates, and alkoxylated zirconates are also useful.

Other monomers that may be polymerized along with the monomers containing hydrogen bonding groups include, without limitation, higher esters of α,β-ethylenically unsaturated monocarboxylic acids containing 3 to 5 carbon atoms such as butanol and higher alcohol esters of acrylic, methacrylic and crotonic acids; butanol and higher diesters of α,β-ethylenically unsaturated dicarboxylic acids containing 4 to 6 carbons; butyrate and higher vinyl esters, vinyl ethers, vinyl ketones such as vinyl ethyl ketone, and aromatic or heterocyclic aliphatic vinyl compounds.

Representative examples of suitable esters of acrylic, methacrylic, and crotonic acids include, without limitation, those esters from reaction with saturated aliphatic and cycloaliphatic alcohols containing 4 to 20 carbon atoms, such as for example n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; and polyalkylene glycol acrylates and methacrylates. Representative examples of other ethylenically unsaturated polymerizable monomers include, without limitation, such compounds as diesters of fumaric, maleic, and itaconic acid with alcohols such as butanol, isobutanol, and tert-butanol. Representative examples of aromatic or heterocyclic aliphatic vinyl compounds include, without limitation, such compounds as styrene, α-methyl styrene, vinyl toluene, tert-butyl styrene, and so on. The selection of monomers is made on the basis of various factors commonly considered in making ink varnishes, including the desired glass transition temperature and the desired dilutability of the resulting polymer in the solvent or solvent system of the ink composition.

The preferred vinyl polymers may be prepared by using conventional techniques, preferably free radical polymerization in a semi-batch process. For instance, the monomers, initiator(s), and any chain transfer agent may be fed at a controlled rate into a suitable heated reactor charged with solvent in a semi-batch process.

Typical free radical sources are organic peroxides, including dialkyl peroxides, such as di-tert-butyl peroxide and dicumyl peroxide, peroxyesters, such as tert-butyl peroxy 2-ethylhexanoate and tert-butyl peroxy pivalate; peroxy carbonates and peroxydicarbonates, such as tert-butyl peroxy isopropyl carbonate, di-2-ethylhexyl peroxydicarbonate and dicyclohexyl peroxydicarbonate; diacyl peroxides, such as dibenzoyl peroxide and dilauroyl peroxide; hydroperoxides, such as cumene hydroperoxide and tert-butyl hydroperoxide; ketone peroxides, such as cyclohexanone peroxide and methylisobutyl ketone peroxide; and peroxyketals, such as 1,1-bis(tert-butyl peroxy)-3,5,5-trimethylcyclohexane and 1,1-bis(tert-butyl peroxy) cyclohexane; as well as azo compounds such as 2,2'-azobis(2-methylbutanenitrile), 2,2'-azobis(2-methyl)propionitrile, and 1,1'-azobis(cyclohexanecarbonitrile). Organic peroxides are preferred. Particularly preferred is tert-butyl peroxy isopropyl carbonate The particular initiator and amount of initiator used depends upon factors known to the person skilled in the art, such as the reaction temperature, the amount and type of solvent (in the case of a solution polymerization), the half-life of the initiator, and so on.

Chain transfer agents may also be used in the polymerization. Typical chain transfer agents are mercaptans such as octyl mercaptan, n- or tert-dodecyl mercaptan, thiosalicylic acid, mercaptocarboxylic acids such as mercaptoacetic acid and mercaptopropionic acid and their esters, and mercaptoethanol; halogenated compounds; and dimeric alpha-methyl styrene. Preferably, no chain transfer agent is included because of odor and other known drawbacks.

The addition polymerization such as by free radical polymerization is usually carried out in solution at temperatures from about 20° C. to about 300° C., preferably from about 150° C. to about 200° C., more preferably from about 160° C. to about 165° C. Preferably, the polymerization is carried out with approximately the same reaction temperature and using the same initiator(s) throughout. The initiator should be chosen so its half-life at the reaction temperature is preferably no more than about thirty minutes, particularly preferably no more than about five minutes, and yet more preferably no more than about two minutes. Particularly preferred are initiators having a half-life of less than about one minute at a temperature of from about 150° C. to about 200° C. In general, more of the branching monomer can be included when the initiator half-life is shorter and/or when more initiator is used. The vinyl polymer vehicles of the invention preferably have little or no residual (unreacted) monomer content. In particular, the vinyl vehicles are preferably substantially free of residual monomer, i.e., have less than about 0.5% residual monomer, and even more preferably less than about 0.1% residual monomer by weight, based on the total weight of the monomers being polymerized.

In a semi-batch process, the monomer and initiator are added to the polymerization reactor over a period of time, preferably at a constant rate. Typically, the add times are from about 1 to about 10 hours, and add times of from about three to about five hours are common. Longer add times typically produce lower number average molecular weights. Lower number average molecular weights may also be produced by increasing the ratio of solvent to monomer or by using a stronger solvent for the resulting polymer.

In general, the branched vinyl polymer of the invention has a low number average molecular weight and a broad polydispersity. The number average molecular weight $M_n$ and weight average molecular weight $M_w$ of a vinyl resin according to the invention can be determined by gel permeation chromatography using polystyrene standards, which are available for up to 6 million weight average molecular weight, according to well-accepted methods. Polydispersity is defined as the ratio of $M_w/M_n$. In one embodiment, the vinyl polymer has a number average molecular weight of at least about 1000, and more preferably at least about 2000. The number average molecular weight is also preferably less than about 15,000, more preferably less than about 10,000, and even more preferably less than about 8500. A preferred range for $M_n$ is from about 1000 to about 10,000, a more preferred range for $M_n$ is from about 2000 to about 8500, and an even more preferred range is from about 4000 to about 8000. The weight average molecular weight should be at least about 30,000, preferably at least about 100,000. The weight average molecular weight is preferably up to about 60 million, based upon a GPC determination using an available standard having 6 million weight average molecular weight. A preferred range for $M_w$ is from about 30,000 to about 55 million, a more preferred range for $M_w$ is from about 100,000 to about 1 million, and a still more preferred range is from about 100,000 to about 300,000. Resins having ultra-high molecular weight shoulders (above about 45 million), which can be seen by GPC, are preferably avoided for the $M_w$ range of from about 100,000 to about 300,000. The polydispersity, or ratio of $M_w/M_n$, may be up to about 10,000, preferably up to about 1000. The polydispersity is preferably at least about 15, particularly preferably at least about 50. The polydispersity preferably falls in the range of from about 15 to about 1000, and more preferably it falls in a range of from about 50 to about 800.

The theoretical glass transition temperature (Tg) can be adjusted according to methods well-known in the art through selection and apportionment of the co-monomers. In a preferred embodiment, the theoretical $T_g$ is above room temperature, and preferably the theoretical $T_g$ is at least about 60° C., more preferably at least about 70° C. The methods and compositions of the present invention preferably employ vinyl polymers having a $T_g$ of from about 50° C. to about 125° C., more preferably from about 60° C. to about 100° C., and even more preferably from about 70° C. to about 90° C. The theoretical glass transition temperature can be determined using the Fox equation.

In one embodiment of the invention, the hydrogen bonding vinyl polymer, which may be a branched vinyl polymer, is combined with other resins in the ink composition. Examples of suitable other resins that may be combined with the hydrogen bonding vinyl polymer include, without limitation, polyester and alkyd resins, phenolic resins, rosins, cellulosics, and derivatives of these such as rosin-modified phenolics, phenolic-modified rosins, hydrocarbon-modified rosins, maleic modified rosin, fumaric modified rosins; hydrocarbon resins, other acrylic or vinyl resins, polyamide resins, and so on. When present, such resins or polymers may be included in amounts of from about 1 part by weight up to about 100 parts by weight, preferably about 3 to about 50 parts by weight, for each part by weight of the hydrogen bonding vinyl polymer of the invention, based upon the nonvolatile weights of the resins.

In addition to the hydrogen bonding vinyl resin and any optional second resin, the ink compositions of the invention preferably include one or more organic solvents. In a preferred embodiment of the invention, the branched vinyl resin forms a solution or apparent solution having no apparent turbidity in the organic solvent or solvents of the ink formulation. The particular organic solvents and amount of solvent included is determined by the ink viscosity, body, and tack desired. In general, non-oxygenated solvents or solvents with low Kauri-butanol (KB) values are used for inks that will be in contact with rubber parts such as rubber rollers during the lithographic process, to avoid affecting the rubber. Suitable solvents for inks that will contact rubber parts include, without limitation, aliphatic hydrocarbons such as petroleum distillate fractions and normal and iso-paraffinic solvents with limited aromatic character. For example, petroleum middle distillate fractions such as those available under the tradename Magie Sol, available from Magie Bros. Oil Company, a subsidiary of Pennsylvania Refining Company, Franklin Park, Ill., under the tradename ExxPrint, available from Exxon Chemical Co., Houston, Tex., and from Golden Bear Oil Specialties, Oildale, Calif., Total Petroleum Inc., Denver, Colo., and Calumet Lubricants Co., Indianapolis, Ind. may be used. In addition or alternatively, soybean oil or other vegetable oils may be included.

When non-oxygenated solvents such as these are used, it is generally necessary to include a sufficient amount of at least one monomer having a substantial affinity for aliphatic solvents in order to obtain the desired solvency of the preferred branched vinyl polymer. In general, acrylic ester monomers having at least six carbons in the alcohol portion of the ester or styrene or alkylated styrene, such as tert-butyl styrene, may be included in the polymerized monomers for this purpose. In a preferred embodiment, an ink composition with non-oxygenated solvents includes a branched vinyl resin polymerized from a monomer mixture including at least about 20%, preferably from about 20% to about 40%, and more preferably from about 20% to about 25% of a monomer that promotes aliphatic solubility such as stearyl methacrylate or t-butyl styrene, with stearyl methacrylate being a preferred such monomer. It is also preferred to include at least about 55% percent styrene, preferably from about 55% to about 80% styrene, and more preferably from about 60% to about 70% styrene. Other monomers may also be used to reduce solvent tolerance in aliphatic solvent, if desired. All percentages are by weight, based upon the total weight of the monomer mixture polymerized. Among preferred monomer compositions for vinyl polymers for lithographic inks are those including a (meth)acrylic ester of an alcohol having 8–20 carbon atoms such as stearyl methacrylate, styrene, divinylbenzene, and a monomer containing hydrogen bonding groups. In a preferred embodiment, a branched vinyl resin for a lithographic printing ink is made with from about 15, preferably about 20, to about 30, preferably about 25, weight percent of a (meth) acrylic ester of an alcohol having 8–20 carbon atoms, especially stearyl methacrylate; from about 50, preferably about 60, to about 80, preferably about 75, weight percent of a styrenic monomer, especially styrene itself.

Preferably, the organic solvent or solvent mixture will have a boiling point of at least about 100° C. and preferably not more than about 550° C. Offset printing inks may use solvents with boiling point above about 200° C. News inks usually are formulated with from about 20 to about 85 percent by weight of solvents such as mineral oils, vegetable oils, and high boiling petroleum distillates. The amount of solvent also varies according to the type of ink composition (that is, whether the ink is for newsprint, heatset, sheetfed, etc.), the specific solvents used, and other factors known in the art. Typically the solvent content for lithographic inks is up to about 60%, which may include oils as part of the solvent package. Usually, at least about 35% solvent is present in lithographic ink. When used to formulate the preferred ink compositions of the invention, these varnishes or vehicles, including the branched vinyl resins, are typically clear, apparent solutions.

The ink compositions of the invention will usually include one or more pigments in the hydrophobic phase. The number and kinds of pigments will depend upon the kind of ink being formulated. News ink, cold set, and book black compositions typically will include only one or only a few pigments, such as carbon black, while custom color inks may include a more complicated pigment package, including colors with special effects such as pearlescence or metallic effect. Lithographic printing inks for full-color printing are typically used in four colors—magenta, yellow, black, and cyan, and custom colors may be included as desired. Any of the customary inorganic and organic pigments may be used in the ink compositions of the present invention. Alternatively, the compositions of the invention may be used as overprint lacquers or varnishes. The overprint lacquers (air drying) or varnishes (curing) are intended to be clear or transparent and thus opaque pigments are not included.

It has been observed that the print quality using lithographic ink compositions of the invention can be a function of pH under certain conditions. As noted above, a wide variety of chemical functional groups in the hydrogen bonding vinyl resin are suitable to provide lithographic single fluid ink compositions that are stable in the fountain and break when applied to the printing plate to provide high quality printed materials. It is believed that the invention operates in part on the principle of a balance between hydrogen donating ability and hydrogen accepting ability between the hydrogen bonding groups of the vinyl resin and the components of the hydrophilic fluid phase. The components of the hydrophilic fluid phase contain hydroxyl groups that have both hydrogen donating ability and hydrogen accepting ability. Depending on the hydrogen bonding vinyl resin chosen for the ink compositions of the invention, hydrogen bonding groups on the vinyl resin may have relatively higher or lower hydrogen donating or accepting ability. If the hydrogen bonding group on the polymer is relatively lower in hydrogen donating ability, then it may be preferred to put a component into the hydrophilic fluid phase to increase its relative hydrogen accepting ability to provide the proper balance. For example, when the hydrogen bonding group on the polymer is an alcohol, it has been found useful to add a weak base to the hydrophilic fluid phase. On the other hand, when the hydrogen bonding functional group on the vinyl resin is an especially strong hydrogen acceptor, care must be taken not to put additives into the hydrophilic fluid phase that would increase the hydrogen donating ability of the hydrophilic fluid phase. For example, when the hydrogen bonding group on the vinyl resin is an amine group, it is preferred not to put a weak acid into the hydrophilic fluid phase. Such a weak acid in the hydrophilic fluid phase would tend to form a salt with the amine on the vinyl resin, leading to poor performance of the ink composition, since the composition would be too stabilized by the ionic pair to break upon application to the printing plate. Inks containing vinyl resins with amine functional groups as discussed above are most effective at approximately a neutral pH.

When the hydrogen bonding functional group on the vinyl resin is an amide or an N-alkylamide, it has been observed that the proper functioning of the ink composition is nearly independent of pH. It is believed that the amide functional group has a proper balance of hydrogen accepting properties so as to accommodate either a low pH, high pH, or neutrality in the hydrophilic fluid phase. In contrast, for hydrogen bonding vinyl resins containing alcohol hydrogen bonding groups, the performance of the ink composition is dependent on the pH.

It is preferred that the hydrophilic fluid phase have Hansen solubility parameters having these values: a dispersion parameter value of at least about 6, a polarity parameter value of at least about 4, and a hydrogen bonding parameter value of at least about 10. Preferably, the hydrophilic fluid phase has Hansen solubility parameters having these values: a dispersion parameter value of from about 8.0 to about 9.0, a polarity parameter value of from about 5.0 to about 8.0, and a hydrogen bonding parameter value of from about 12 to about 20.

At least a small amount of water is often desirable in order to aid in dissolving or homogenizing the ingredients of the hydrophilic fluid phase. In general, about 4 or 5% by weight of water may be included in the hydrophilic fluid phase for this purpose. When water is present in higher amounts, and especially when the hydrophilic fluid phase is more than 50% water, adjustments are generally necessary to obtain satisfactory inks. For example, organic or inorganic salts should be added to the hydrophilic fluid phase to maintain the integrity of the emulsion. Such salts include, without limitation, monovalent or divalent salts that are at least partially soluble in the hydrophilic fluid phase. Examples of such salts include, without limitation, as lithium, sodium, potassium, magnesium, calcium, iron(II), manganese(II), copper(II), and zinc salts, particularly the acetates, hydroxyacetates, nitrates, sulfates, phosphates, hydrogen phosphates, hydrogen sulfates, chlorates, chlorides, bromides, and iodides of these metals, and the like. Such salts may be included in the hydrophilic fluid phase at up to about 5% by weight, preferably from about 0.01% to about 5% by weight, more preferably from about 0.1% to about 1.5% by weight. In addition, when the hydrophilic fluid phase contains more than about 5% water, any chemical groups that can participate in a hydrogen bond in the ink vehicles (such as the commonly used acid functional alkyd vehicles) should be used in lesser amounts. A wetting agent, such as polyvinylpyrrolidone, may be added to aid in wetting of the plate. From about 0.5 weight percent to about 1.5 weight percent of the polyvinylpyrrolidone is included, based on the weight of the ink composition.

It will be appreciated by the skilled artisan that other additives known in the art may be included in the ink compositions of the invention, so long as such additives do not significantly detract from the benefits of the present invention. Illustrative examples of these include, without limitation, pour point depressants, surfactants, wetting agents, waxes, emulsifying agents and dispersing agents, defoamers, antioxidants, UV absorbers, dryers (e.g., for formulations containing vegetable oils), flow agents and other rheology modifiers, gloss enhancers, and anti-settling agents. When included, additives are typically included in amounts of at least about 0.001% of the ink composition, and may be included in amount of about 7% by weight or more of the ink composition.

The compositions of the invention are suited for any lithographic applications, including, without limitation, as heatset inks, news inks, and sheetfed inks. Offset printing processes in general in which the inks of the invention may be used are well-known in the art and are described in many publications.

The single fluid ink utilized with the present invention is illustrated by the following examples. The examples are merely illustrative and do not in any way limit the scope of the invention as described and claimed. All parts are parts by weight unless otherwise noted.

EXAMPLES

In the Examples, t-BICM75 is a 75% solution of t-butylperoxyisopropyl carbonate in mineral spirits.

Example 1
Preparation of a Hydrogen Bonding Vinyl/Resin with Carboxyl Groups An amount of 44.19 parts by weight of Total 220 (a petroleum middle distillate fraction available from Total Petroleum, Inc.) is charged to a glass reactor equipped with stirrer, nitrogen inlet, total reflux condenser, and monomer inlet. The solvent is heated to 160° C. with stirring under a blanket of nitrogen. A monomer mixture of 36.01 parts by weight styrene, 12.27 parts by weight stearyl methacrylate, 2.62 parts by weight divinylbenzene, 1.89 parts by weight, methacrylic acid, and 2.79 parts by weight t-BICM75 is added to the reactor over a period of three hours. After the monomer addition is complete, 0.23 parts by weight of t-BICM75 is added over a period of fifteen minutes. The temperature is held at 160° C. for an additional two hours to allow for complete conversion of the monomer to polymer. The measured amount of non-volatile matter (NVM) is 55%. The percent conversion, measured as NVM divided by the percent of the total weight of monomers, is 100.1. The acid number on solution is 12.0 mg KOH per gram. The viscosity is 30 Stokes (bubble tube, 54.4° C.). The solvent tolerance is 230% and the NVM at cloud point is 16.7%.

Example 2
Preparation of a Hydrogen Bonding Vinyl Resin with Carboxyl Groups An amount of 44.22 parts by weight of Golden Bear 1108 (a petroleum middle distillate fraction available from Golden Bear Oil Specialties) is charged to a reaction flask equipped with stirrer, nitrogen inlet, total reflux condenser, and monomer inlet. The solvent was heated to 145° C. with stirring. A monomer mixture of 33.86 parts by weight styrene, 12.6 parts by weight stearyl methacrylate, 3.1 parts by weight n-butyl acrylate, 1.31 parts by weight divinylbenzene HP (80% divinylbenzene), 1.89 parts by weight methacrylic acid, and 2.89 parts by weight t-BICM75 is added to the reaction flask over a period of 3 hours. After the monomer addition is complete, 0.23 parts by weight of t-BICM75 is added to the flask over a period of 15 minutes. The temperature is held at 145° C. for an additional two hours to allow for complete conversion of the monomer to polymer. The measured amount of non-volatile matter (NVM) is 56%. The percent conversion, measured as the percent of the total weight of monomers converted to non-volatile matter is 101.5. The acid number on solution is 12.0 mg KOH per gram. The viscosity is 47 Stokes (bubble tube, 54.4° C.). The solvent tolerance is greater than 1400% and the NVM at cloud point is less than 3.7% (i.e., no cloud point is observed yet at this dilution).

Example 3
Preparation of a Hydrogen Bonding Vinyl Resin with Carboxyl Groups An amount of 461.2 parts by weight of Calumet 600 (a petroleum middle distillate fraction available from Calumet Lubricants Co.) is charged to a glass reactor equipped with stirrer, nitrogen inlet, total reflux condenser, and monomer inlet. The solvent is heated to 145° C. with stirring under a blanket of nitrogen. A monomer mixture of 350.1 parts by weight styrene, 131.3 parts by weight stearyl methacrylate, 42.1 parts by weight n-butyl acrylate, 17.1 parts by weight divinylbenzene HP, 9.8 parts by weight methacrylic acid, and 29.2 parts by weight t-BICM75 is added to the reactor over a period of three hours. After the monomer addition is complete, 2.4 parts by weight of t-BICM75 is added over a period of fifteen minutes. The temperature is held at 145° C. for an additional two hours to allow for complete conversion of the monomer to polymer. The measured amount of non-volatile matter (NVM) is 56%. The percent conversion, measured as NVM divided by the percent of the total weight of monomers, is 101.6. The acid number on solution is 6.3 mg KOH per gram. The viscosity is 35 Stokes (bubble tube, 54.4° C.). The solvent tolerance is 80% and the NVM at cloud point is 31.0%.

Example 4
Preparation of a Vinyl Resin without Hydrogen Bonding Groups for Comparative Testing An amount of 1548.1 parts by weight of ExxPrint 283D (a petroleum middle distillate fraction available from Exxon Chemical Co.) is charged to a glass reactor equipped with stirrer, nitrogen inlet, total reflux condenser, and monomer inlet. The solvent is heated to 145° C. with stirring under a blanket of nitrogen. A monomer mixture of 1248.5 parts by weight styrene, 429.6 parts by weight stearyl methacrylate, 102.8 parts by weight n-butyl acrylate, 68.9 parts by weight divinylbenzene HP, and 85.7 parts by weight t-BICM75 is added to the reactor over a period of three hours. After the monomer addition is complete, 16.4 parts by weight of t-BICM75 is added over a period of fifteen minutes. The temperature is held at 145° C. for an additional two hours to allow for complete conversion of the monomer to polymer. The measured amount of non-volatile matter (NVM) is 56%. The percent conversion, measured as NVM divided by the percent of the total weight of monomers, is 101.4. The viscosity is 26 Stokes (bubble tube, 54.4° C.). The solvent tolerance is 160% and the NVM at cloud point is 21.5%.

Example 5
Preparation of a Heatset Single Fluid Printing Ink According to the Invention 58.0 grams of the following Mixture 5A is added to 142.0 grams of the following Mixture 5B with stirring. The ink composition is mixed for 20 minutes on a dispersator, maintaining a vortex and holding the temperature under 140° F. The ink composition has a single fall time Laray of 14 to 17 seconds for 500 grams at 30° C. When used in a single-fluid heatset lithographic printing process, the ink prints without toning.

Mixture 5A:

Mix in a glass beaker until clear 181.0 grams of diethylene glycol, 8.0 grams of deionized water, 0.4 grams of citric acid, and 0.4 grams of magnesium nitrate. Add 191.2 grams of diethylene glycol and mix until homogenous.

Mixture 5B:

Mix, using a high-speed mixer, 46.0 grams of the vinyl vehicle of Example 1, 4.0 grams of Blue Flush 12-FH-320 (available from CDR Corporation, Elizabethtown, Ky.) 1.0 gram technical grade Soy oil (available from Cargill, Chicago, Ill.) and 0.6 grams of an antioxidant. While mixing, add 34.4 grams of a hydrocarbon resin solution (60% LX-2600 in ExxPrint 283D, available from Neville), 27.0 grams of a carbon black (CSX-156 available from Cabot Corp.), and 1.0 gram of a polytetrafluoroethylene wax (Pinnacle 9500D, available from Carrol Scientific). Mix at a high speed for 30 minutes at 300° F. Slow the mixing speed and add 27.0 grams of ExxPrint 588D (available from Exxon). Mill the premix in a shot mill to a suitable grind. Mixture B has a Laray viscosity of 180 to 240 poise and a Laray yield of 800 to 1200 (according to test method ASTM D-4040: Power Law-3 k, 1.5 k, 0.7 k, 0.3 k). Mixture 5B is tested on the Inkometer for one minute at 1200 rpm for a measured result of 25 to 29 units.

Example 6
Preparation of a News Ink Single Fluid Printing Ink According to the Invention Mixture 6A:

A mixture of 87.0 grams of diethylene glycol, 12.7 grams of glycerin, 0.15 gram of citric acid monohydrate, and 0.15 grams of magnesium nitrate hexahydrate is stirred with heat (at 130–140° F.) until homogenous.

Mixture 6B:

A blend of 40.2 grams of a gilsonite varnish, 0.8 gram oronite, 17.9 grams MSO solvent (available from Calumet), and 41.1 grams of a carbon black (CSX-320 from Cabot Corp.) were mixed with shear to a 4.0 on the Hegman grind gauge, and then ground in a shot mill to a grind on a 2 mil gauge of at least %10. The Laray viscosity at 30° C. is measured as 296 poise for a drop with 2000 grams of added weight and as 1332 poise for a drop with 200 grams of added weight (±25% accuracy) and gives an inkometer reading at 90° F. (32° C.) for 1 minute at 400 rpm followed immediately by 1 minute at 1200 rpm of 5–10 units.

News Ink:

The news ink is prepared by mixing together 32.4 grams of the mixture B and 37.6 grams of Example 2 to obtain a Mixture 6C having an inkometer reading at 90° F. (32° C.) for 1 minute at 400 rpm followed immediately by 1 minute at 1200 rpm of 18.8 units, a Laray viscosity at 30° C. of 375 poise for a drop with 2000 grams of added weight and 565 poise for a drop with 200 grams of added weight (±25% accuracy), and a viscosity as measured according to ASTM D4040 (power law 2000, 1500, 1000, 500) at 2500 s$^{-1}$ of 285 poise with a pseudo yield of 1709 dynes per cm$^2$. To obtain the ink, 30.0 grams of Mixture 6A is added to Mixture 6C with mixing at 3000 rpm for 10 minutes. The resulting ink has a single fall time Laray at 30° C. of 21 seconds for 500 grams. The ink did not exhibit toning when using in a single-fluid lithographic printing process.

Example 7

Synthesis of a Hydrogen Bonding Vinyl Resin Containing Hydroxyl Groups

Solvent ExxPrint 274A, 461.5 grams, was charged to a reactor equipped with a stirrer, a nitrogen inlet, a total condenser and an inlet port. A monomer/initiator blend of 371.5 grams styrene, 126.5 grams stearyl methacrylate, 23.9 grams divinylbenzene HP, 29.8 grams hydroxypropyl methacrylate, and 27.7 grams of t-BICM75 was charged to the reactor through the inlet port over a period of two hours and 15 minutes. During addition, the temperature was maintained at 160° C. and the reactor was blanketed with nitrogen. After addition, 2.5 grams of t-BICM75 were added, and the reaction was run for an additional two hours. The reaction product was poured through a fine strainer into a container for storage. The measured amount of non-volatile material (NVM) was 56.2%. The percent conversion, measured as the percent of the total weight of monomers converted to non-volatile matter, was 102.2. The viscosity was 12.6 stokes (bubble tube 54.4° C.). The solvent tolerance was 380% and the NVM at cloud point was 11.7%.

Example 8

Synthesis of a Hydrogen Bonding Vinyl Resin Containing Amide Groups

Solvent ExxPrint 274A, 461.5 grams, was charged into a reactor equipped with a stirrer nitrogen inlet total condenser and inlet port and heated with stirring to 160° C. A monomer initiator blend containing 376.8 grams styrene, 128.3 grams stearyl methacrylate, 23.9 grams divinylbenzene HP, 22.7 grams N,N-dimethyl acrylamide, and 27.7 grams t-BICM75 was charged through the inlet port over a period of 2 hours and 15 minutes during which time the temperature was maintained with stirring at 160° C. and the reactor was blanketed with nitrogen. After the addition was completed, 2.5 grams of t-BICM75 was added and the reaction continued for an additional 2 hours. The measured amount of non-volatile matter (NVM) was 56.6%. The percent conversion was 103.0. The viscosity was 23.5 stokes at 54.4° C. The solvent tolerance was 688% and the NVM at cloud point was less than 8.2%.

Example 9

Using a high speed mixer, 118 grams of the hydrogen bonding vinyl resin of Example 8 were mixed with 102.5 grams of blue flush 15 FQ-308 (containing phthalocyanine blue, available from CDR Corporation, Elizabethtown, Ky.), 16.5 grams of alkyl refined linseed oil, and 5 grams of a Teflon wax. While mixing, 116.5 grams of a hydrocarbon resin solution (60% Lx-2600 in ExxPrint 283D, available from Neville) was added and mixed at a high speed for 30 minutes at 160° F. to form a mixture 9b. The mixing speed was slowed and 28.3 parts by weight of mixture 5a was added to 71.7 parts by weight of mixture 9b. The finished viscosity of the ink (cone in plate rheometer) at 30° C. was 178.3 Pa s.

The ink was tested for stability and toning in a lithographic printing process. The fountain stability of the ink was greater than 900 seconds, and the ink printed with no toning.

Example 10

Preparation of an Ink Containing an Amide Functional Vinyl Resin

Mixture 10a was formed by mixing in a glass beaker until clear 181 grams of diethylene glycol, 8 grams of deionized water, 0.4 grams triethanolamine, and 0.4 grams of magnesium nitrate. To this was added 191.2 grams of ethylene glycol and mixed until homogeneous.

Using a high speed mixer 118 grams of the hydrogen bonding vinyl resin of Example 7 was mixed with 102.5 grams of blue flush 15 FQ-308 (containing phthalocyanine blue, available from CDR Corporation, Elizabethtown, Ky.), 16.5 grams of alkyl refined linseed oil, and 5 grams of a Teflon wax. With mixing, 116.5 grams of a hydrocarbon resin solution (60% LX-2600 in ExxPrint 283D, available from Neville) was added and mixed at a high speed for 30 minutes at 160° F. to form a mixture 10b.

To make the ink, 28.3 parts by weight of mixture 10a was mixed with 71.7 parts of mixture 10b. The finished viscosity of the ink (cone in plate rheometer) at 30° C. was 101.8 Pa s.

The ink was tested for stability and toning in a lithographic printing process. The fountain stability of the ink was greater than 900 seconds, and the ink printed with no toning.

Examples 11–16 and Comparative Examples A–D

Examples 11–16 and comparative examples A–D were prepared by a method similar to that of Example 5 with the components and the amount of components as listed in the following table. The Examples were tested for stability in a fountain solution, and for toning in a lithographic printing process. Examples 11–13 were made with the acid functional vinyl resin of Example 1 while Examples 14–16 were made with the acid functional vinyl resin of Example 3. The hydrophilic phase of all Examples 11–16 contained the diethylene glycol, ethylene glycol and water mixture of Example 5A, further containing citric acid and magnesium nitrate. In the comparative examples, inks were run in lithographic printing processes that did not contain the hydrogen bonding vinyl resins of the invention. Comparative Examples A–C contained the vinyl resin of Example 4, which contains no functional groups capable of forming hydrogen bonds to the components of the hydrophilic phase. Comparative Example D was run on an ink made of a conventional rosin modified hydrocarbon solution. In the case of comparative Examples A–C, the ink was not stable in the fountain and was not stable enough to run in the printing process. Comparative Example D was stable enough to run in the printing process, but it exhibited toning on the first sheet printed.

| Material | Example 11 | Example 12 | Example 13 | Example 14 | Example 15 | Example 16 |
|---|---|---|---|---|---|---|
| Acid-functional vinyl resin of Example 1 | 8 | 18 | 37 | | | |
| Acid-functional vinyl resin of Example 3 | | | | 8 | 18 | 37 |
| Hydrocarbon varnish solution[1] | 32.5 | 22.5 | | 32.5 | 22.5 | |
| Uncoated black base[2] | 30 | 30 | 30 | 30 | 30 | 30 |
| Total 220 | 0.5 | 0.5 | 4 | 0.5 | 0.5 | 4 |
| Diethylene glycol mix[3] | 29 | 29 | 29 | 29 | 29 | 29 |
| Fountain Break Time (seconds) | >600 | >600 | >600 | >600 | >600 | >600 |
| Tone | Clean | Clean | Clean | Clean | Clean | Clean |

[1]LX2600 (available from Neville Chemical Co., Pittsburgh, PA.), 60% in ExxPrint 283D
[2]45% carbon black pigment in 51% of the hydrocarbon varnish solution, 3% soy oil, 1% of anti-oxidant
[3]Mixture 5A of Example 5.

| Material | Comparative Example A | Comparative Example B | Comparative Example C | Comparative Example D |
|---|---|---|---|---|
| Vinyl resin of Example 4 | 8 | 18 | 37 | |
| Rosin modified hydrocarbon solution[4] (acid number of 4.8 on solution) | | | | 37 |
| Hydrocarbon varnish solution[1] | 32.5 | 22.5 | | |
| Uncoated black base[2] | 30 | 30 | 30 | 30 |
| Total 220 | 0.5 | 0.5 | 4 | 4 |
| Diethylene glycol mix[3] | 29 | 29 | 29 | 29 |
| Fountain Break Time (seconds) | 200 | 60 | 5 | >600 |
| Tone | (not stable enough to run) | (not stable enough to run) | (not stable enough to run) | Immediate (tones on first sheet) |

[1]55% RP 369 (available from Westvaco, St. Louis, MO) in ExxPrint 283D.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A printing method, comprising the steps of: depositing a generally pH neutral hydrophilic material to non-image areas of a plate cylinder, wherein said pH neutral hydrophilic material has a thickness of between 1 and 1.5 microns;

applying a single fluid ink solution to said plate cylinder; and rolling said plate cylinder on a print member for applying ink to a print medium.

2. The printing method according to claim 1, wherein said hydrophilic material includes one of poly-vinyl alcohol, poly-ethylene oxides, block co-polymers of poly-ethylene oxide and poly-propylene oxide, and poly-vinyl pyrolidone.

3. The printing method according to claim 1, wherein said single fluid ink includes a hydrogen bonding vinyl polymer and an emulsified phase comprising a member selected from the group consisting of water, liquid polyols and combinations thereof.

4. The printing method according to claim 1, wherein said generally pH neutral hydrophilic material has a pH of between 5 and 8.5.

* * * * *